UNITED STATES PATENT OFFICE.

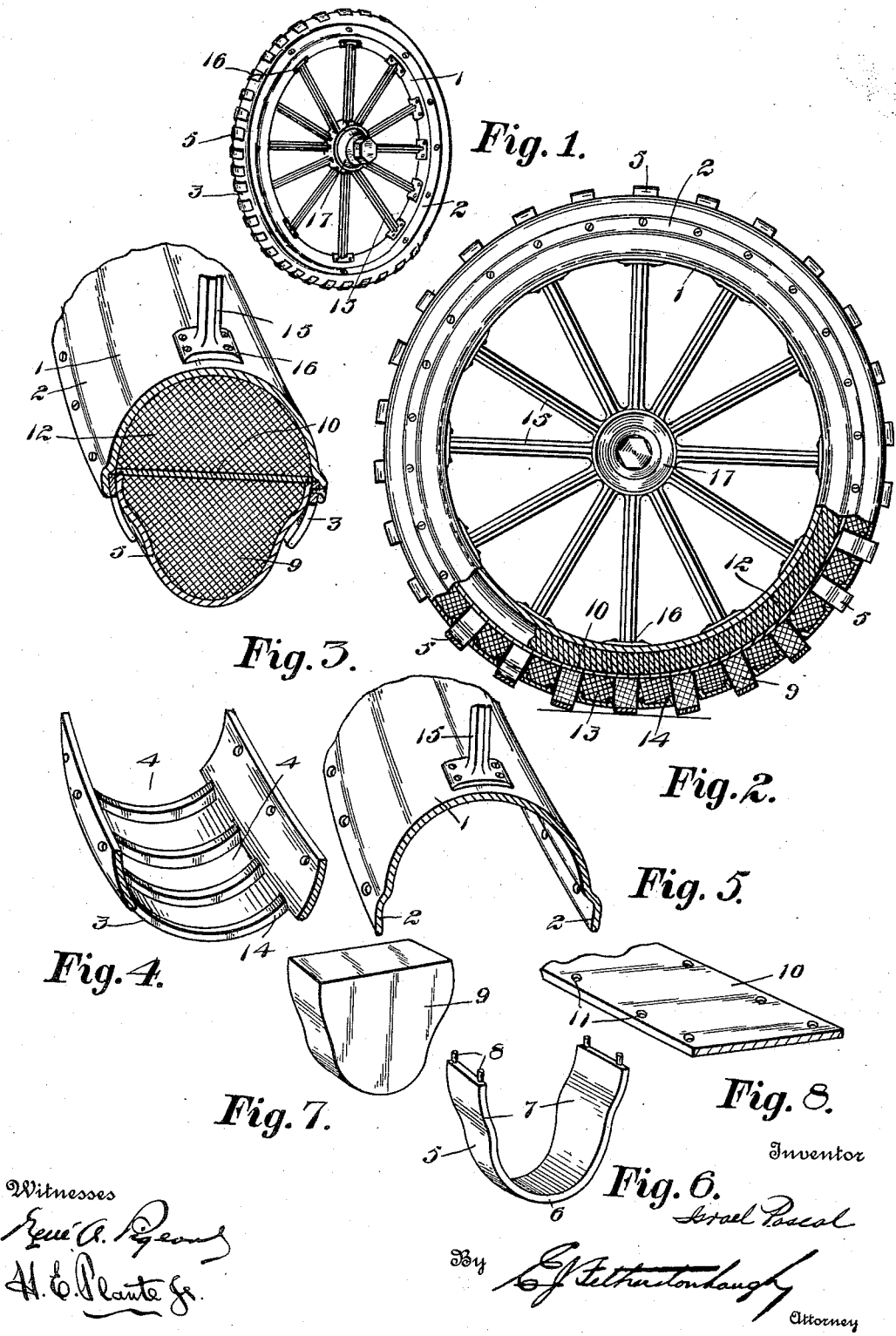

ISRAEL PASCAL, OF MONTREAL, QUEBEC, CANADA, ASSIGNOR OF SIX-TENTHS TO MOSES ALBERT, OF MONTREAL, CANADA.

VEHICLE-WHEEL.

1,018,774.     Specification of Letters Patent.     Patented Feb. 27, 1912.

Application filed May 6, 1911. Serial No. 625,435.

*To all whom it may concern:*

Be it known that I, ISRAEL PASCAL, resident of 20 Rivard street, in the city and district of Montreal, Province of Quebec, Dominion of Canada, a subject of the King of Great Britain, have invented certain new and useful Improvements in Vehicle-Wheels; and I do hereby declare that the following is a full, clear, and exact description of the same.

The invention relates to an improvement in vehicle wheels, as described in the present specification and illustrated in the accompanying drawings that form part of the same.

The invention consists essentially of the novel construction and arrangement of parts whereby the cushion effect is attained with metal shoes resiliently supported in a rigid tire case.

The objects of the invention are to devise an indestructible easy riding tire, to eliminate the pneumatic feature in the tread portion of the tire, and generally to provide a simple cheap and durable form of vehicle tire.

In the drawings, Figure 1 is a perspective view of the wheel complete. Fig. 2 is an enlarged vertical part sectional view of the wheel. Fig. 3 is an enlarged cross sectional perspective view of a portion of the rim and tire. Fig. 4 is an enlarged cross sectional perspective view of a portion of the outer part of the tire case. Fig. 5 is an enlarged cross sectional perspective view of a portion of the rim or inner part of the tire case. Fig. 6 is a detail of a metal shoe. Fig. 7 is a detail of a rubber filling block for said shoe. Fig. 8 is a sectional perspective detail of a portion of the shoe supporting band.

Like numerals of reference indicate corresponding parts in each figure.

Referring to the drawings, 1 is the rim of the wheel, semi-circular in cross section having the flanges 2 at the outer edges and forming the inner half of the tire case, said rim being preferably formed of metal.

3 is the outer half of the tire case, also preferably formed of metal and semi-circular in cross section and fitting into the flanges 2, said outer half of the tire case having cross shoe slots 4 suitably distanced one from the other.

5 are the shoes, each having the arc-shaped tread portion 6 terminating in the off-set 7.

8 are pins projecting from the off-sets 7.

9 are rubber blocks correspondingly shaped and fitted into the shoes 5.

10 is a circular band having the holes 11 through which the pins 8 project, said pins being splayed over on the inner side of said band, said shoes 5 being correspondingly spaced on the band 10 to the distances between the shoe slots 4.

12 is a ring of rubber preferably solid and semi-circular in cross section and fitted into the rim 1 forming a bed on which the circular band 10 is mounted.

13 are distance blocks of rubber between the rubber blocks 9 and between the flanges 14 extending inwardly from the edges of the shoe slots 4.

It will be thus seen that when the parts are assembled, the shoes 5, which are opposite the shoe slots 4 extend therethrough beyond the rigid outer part of the case 3, the said part 3 and the said rim 1 being suitably secured together by bolts or rivets or any other form of fastening.

15 are spokes of any suitable pattern and here shown as of flanged metal formation each having the base 16 rigidly secured to the rim 1 and extending therefrom to the central hub 17.

In the use of this invention in the running gear of vehicles, the weight of the vehicle is supported from the ground directly on the shoes 5, which are preferably of a stiff spring steel and have sharp gripping edges, so that on slippery roads, either ice, snow or otherwise, the resiliency of the inner part gives the shoe a forward or rearward grip on the road.

There are two directions to the movement of the cushion part formed by the movement of the inner rubber cushion and the spring steel band, that is to say, the direct downward weight of the vehicle will have the tendency to force in the rubber in a radial line with the spokes, while in the gripping of the shoes, in the forward or rearward movement, the bend of the spring band forces the rubber in another direction. These two movements of the rubber are important as they add materially to efficiency in operation.

What I claim as my invention is:

1. In a vehicle wheel, a hollow metallic tire case having transverse spaced slots in its periphery, an annular spring metal band disposed within said tire case and having spring metal loops secured transversely thereacross and projecting through said slots in the tire case, means for resiliently supporting said metal band disposed therebeneath, a hub and means for supporting said tire case from said hub.

2. In a vehicle wheel, a hub, spokes extending from said hub, a hollow rim of substantially semi-circular formation in cross section rigidly secured to said spokes, a ring of rubber substantially semi-circular in cross section forming a resilient bed in said rim, a circular spring band mounted on said rubber bed, a plurality of spring metal shoes having an arc-shaped tread portion and rigidly secured at their upper ends to said band and suitably spaced, an outer ring case semi-circular in cross section having cross slots through which said shoes project rigidly secured to said inner case, and distance blocks between said shoes.

3. In a vehicle wheel, a hub, spokes extending from said hub, a hollow ring forming the inner part of a tire case and rigidly secured to said spokes, a rubber ring forming a resilient bed in said rim, a circular spring metal band mounted on said resilient bed, a plurality of spring metal shoes having arc-shaped tread portions and rigidly secured to said metal band at suitable distances apart, rubber blocks filling in said shoes, rubber distance blocks between said shoes, and an outer ring casing substantially semi-circular in cross section having cross slots through which said shoes project rigidly secured to said rim.

Signed at the city and district of Montreal, Quebec, Canada, this twenty-first day of April, 1911.

ISRAEL PASCAL.

Witnesses:
H. E. PLAUTE, Jr.,
P. SHEE.

Copies of this patent may be obtained for five cents each, by addressing the "Commissioner of Patents, Washington, D. C."